(12) United States Patent
Umiastowski

(10) Patent No.: US 7,213,847 B2
(45) Date of Patent: May 8, 2007

(54) EXHAUST FUME DIVERTER

(76) Inventor: Tomasz Umiastowski, Lot 1 Unit 2 Colo Rd., Colovale New South Wales 2575 (AU)

( * ) Notice: Subject to any disclaimer, the term of this patent is extended or adjusted under 35 U.S.C. 154(b) by 125 days.

(21) Appl. No.: 10/496,072

(22) PCT Filed: Jun. 6, 2002

(86) PCT No.: PCT/AU02/01653

§ 371 (c)(1),
(2), (4) Date: May 20, 2004

(87) PCT Pub. No.: WO03/047899

PCT Pub. Date: Jun. 12, 2003

(65) Prior Publication Data

US 2005/0006901 A1 Jan. 13, 2005

(30) Foreign Application Priority Data

Dec. 7, 2001 (AU) .................... PR9473

(51) Int. Cl.
F16L 27/10 (2006.01)
(52) U.S. Cl. ............... 285/235; 285/181; 280/421; 180/89.2; 180/296
(58) Field of Classification Search ......... 285/235, 285/226, 225, 223, 181, 182; 60/322; 280/421; 180/89.2, 296
See application file for complete search history.

(56) References Cited

U.S. PATENT DOCUMENTS 1,447,749 A * 3/1923 Beselin .................. 40/407
2,275,622 A * 3/1942 Gatien .................. 237/12.3 A
2,489,480 A * 11/1949 Chester ................. 285/148.23
2,489,481 A * 11/1949 Chester ................. 180/311
2,515,391 A * 7/1950 Arbib .................. 293/113
2,721,097 A * 10/1955 Rittenhouse ............ 298/1 H
2,771,908 A * 11/1956 Wilson ................ 285/223
3,134,628 A * 5/1964 Lackey et al. ........... 298/21 R
3,466,093 A 9/1969 Lars et al.
4,573,550 A 3/1986 Inomata et al.
4,907,666 A 3/1990 Tecco
5,044,653 A * 9/1991 Savanella ................ 280/421
5,328,209 A * 7/1994 Cromwell ................ 285/1
5,453,048 A 9/1995 Zima et al.
5,511,828 A 4/1996 Kurek et al.
6,095,460 A 8/2000 Mercer et al.
6,141,958 A * 11/2000 Voss .................... 60/272
6,663,269 B1 * 12/2003 Leu .................... 362/487

FOREIGN PATENT DOCUMENTS

| DE | 19953995 A1 | 5/2001 |
| EP | 0855496 A1 | 7/1998 |
| EP | 095724 A1 | 11/1999 |
| EP | 1069289 A1 | 1/2001 |
| JP | 706908 A1 | 3/1995 |
| JP | 2001073757 A1 | 3/2001 |

* cited by examiner

Primary Examiner—David Bochna
(74) Attorney, Agent, or Firm—Townsend and Townsend and Crew LLP

(57) ABSTRACT

A diverter for vehicle exhaust fumes inhibits or prevents the accumulation of exhaust fumes in a trailer towed by a vehicle. The diverter includes a flexible component (67) which is able to accommodate misalignment between the vehicle and trailer during transport. A coupling (64, 65) is used to removably attach the diverter to a vehicle exhaust (62).

16 Claims, 6 Drawing Sheets

EXHAUST FUME DIVERTER

BACKGROUND OF THE INVENTION

1. Technical Field

The present invention relates to exhaust components and more particularly to a diverter which is used in conjunction with a trailer or float.

2. Background Art

A motor vehicle typically includes a rear-mounted exhaust pipe. If the vehicle is designed and sealed correctly and the exhaust pipe is properly located, it is expected that exhaust fumes will not enter the passenger compartment when the vehicle is in motion. However, some vehicles have faulty sealing or suffer from faulty exhaust systems. Furthermore, when towing a trailer, float or other vehicle, the wake or pattern of air flow behind the vehicle and in front of the trailer, float or other vehicle may become distorted. This may cause exhaust fumes to enter the passenger compartment, for example from the trunk or boot or station wagon door. Further, it is believed that noxious exhaust fumes are drawn into a trailer, horse float or other trailer-type vehicle when it is being towed. Thus, when a vehicle such as a trailer or float is being towed, noxious fumes from the towing vehicle may enter the trailer or float when it is in motion.

For the purposes of the present disclosure, enclosed trailers, horse floats and a broad range of enclosed trailer structures such as those which are used as temporary or permanent residences or shelters for humans or animals are all deemed "trailers". The purpose of the present invention is to provide an exhaust fume diverter which reduces or eliminates the flow of noxious exhaust fumes into the interior of a trailer, particularly when it is being towed.

SUMMARY OF THE INVENTION

Accordingly, the invention provides an extension conduit which extends from a forward coupling which is adapted to attach and seal the conduit to an exhaust of a towing vehicle. The conduit extends from the towing vehicle's exhaust to a location on or under a trailer. The conduit comprises a flexible portion.

In one embodiment of the invention, the conduit further comprises a rear coupling and a chimney. The rear coupling may be adapted to engage and seal against a lower extremity of the chimney.

BRIEF DESCRIPTION OF THE DRAWINGS

In order that the invention may be more readily understood and put into practical effect, reference will now be made to the accompanying drawings in which.

DESCRIPTION OF THE PREFERRED EMBODIMENTS

Figure 1:
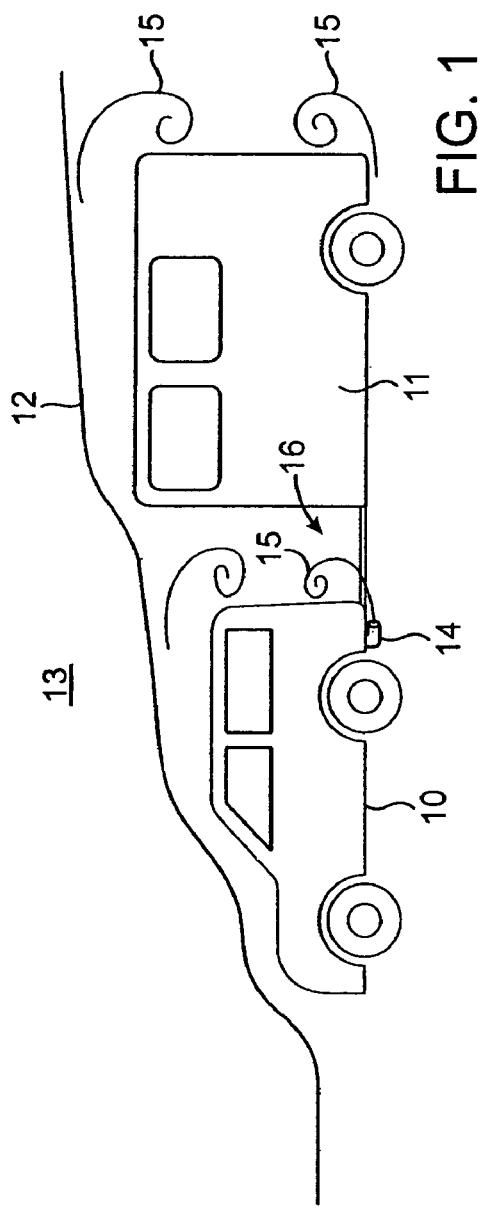
FIG. 1 is a schematic side elevation of a towing vehicle and a trailer.

As shown in FIG. 1, a towing vehicle 10 which is pulling or towing a trailer, float or other type of trailer 11 creates a wake zone 12. Within the wake zone 12, air is accelerated and in part turbulated by the movement of the vehicle and trailer 10, 11. Air 13 which is out of the wake zone 12 is not affected by the movements of the vehicle 10 or trailer 11. In a towing vehicle 10 with a conventional exhaust pipe 14, noxious fumes 15 from the vehicle's exhaust 14 are likely to enter the interior of the trailer 11. In some cases, turbulent patterns are created in the space 16 located between the vehicle 10 and the trailer 11, which patterns cause exhaust fumes to enter the passenger compartment of the vehicle 10. The intrusion of exhaust fumes into the passenger compartment of the vehicle 10 has obvious negative consequences.

It should also be noted that where the trailer 11 is carrying live animals such as in the case of a horse float, the entry of exhaust fumes into the interior can have serious consequences to the health or sporting performance of any animal contained within the trailer or float 11.

Noxious exhaust fumes can also accumulate within an empty trailer 11 and remain within it after the trailer is parked, so that humans that enter the trailer 11 even after it is parked are exposed to accumulated exhaust fumes. Vehicle exhaust gases are rich in carbon monoxide, which is an odorless, colorless toxic gas which is heavier than air. For this reason, the occupants of the trailer 11, whether human or animal, may not be aware of the presence of exhaust fumes which have entered or accumulated within the interior compartment of the trailer 11.

Figure 2:
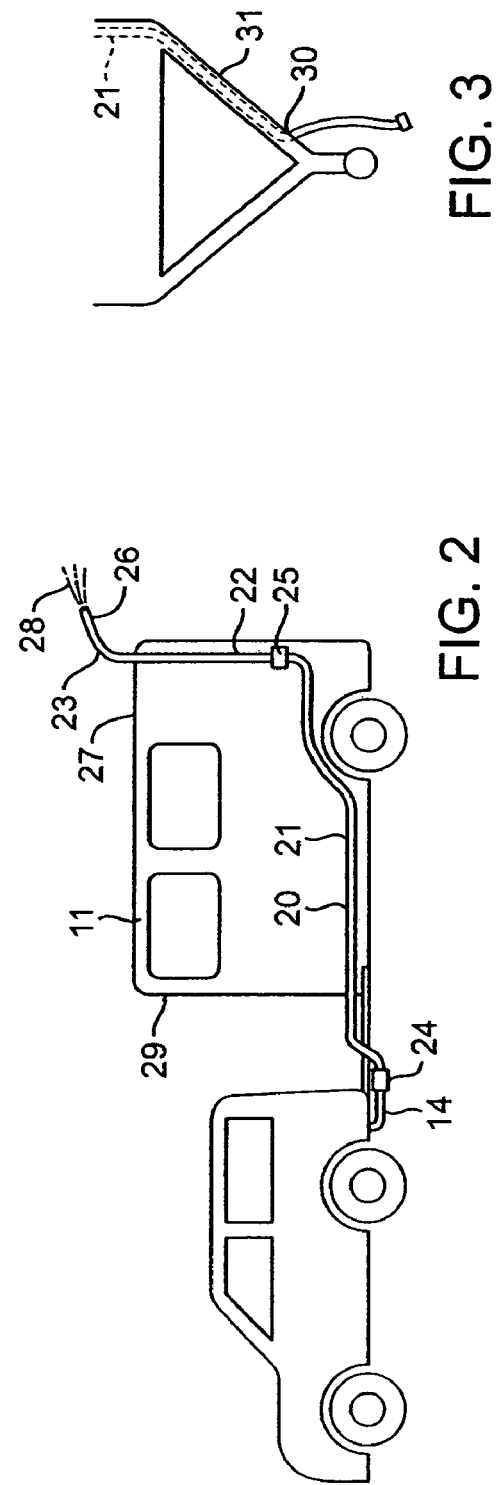
FIG. 2 is a side elevation of a towing vehicle and trailer equipped with an exhaust fume diverter shown in FIG. 2.

As shown in FIG. 2, an exhaust fume diverter 20 comprises a conduit 21 which extends from the vehicle exhaust pipe 14 to the lowermost extent 22 of an exhaust riser or chimney 23. A coupling 24 is used to join and seal the conduit 21 to the exhaust pipe 14. The coupling 24 may be flexible enough to seal against the exhaust pipe 14 or may be equipped with straps or buckles to positively seal the conduit 21 against the exhaust pipe 14. The conduit 21 may comprise a flexible hose, a rigid pipe or any combination of these. In the example depicted in FIG. 2, the riser or chimney 23 is a rigid tube or pipe which is attached to the conduit 21 by a coupling 25. In preferred embodiments of the invention, the distal end 26 of the riser or chimney 23 is high enough above the highest point 27 of the trailer 11 so as to vent the exhaust fumes 28 above and out of the wake zone 12. In this example, the chimney or riser 23 is shown as being located at the rear of the trailer 11. It will be appreciated that the riser or chimney 23 could be mounted toward a forward portion 29 of the trailer 11 if it were high enough to minimize the risk that exhaust fumes 28 could be introduced into the interior compartment of the trailer 11.

Figure 3:
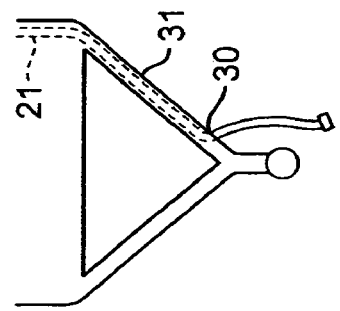
FIG. 3 is a top plan view of a trailer hitch frame within which is concealed a section of the conduit of the exhaust fume diverter shown in FIG. 2.

In many instances, some or all of the frame or chassis of the trailer vehicle 11 are fabricated from tubular or hollow steel components. As shown in FIG. 3, portions of the conduit 21 may be concealed within hollow chassis elements. In this example, the conduit 21 enters a forward portion 30 of the trailer hitch 31. The conduit 21 then passes through the hollow frame to a convenient exit point.

Figure 4:
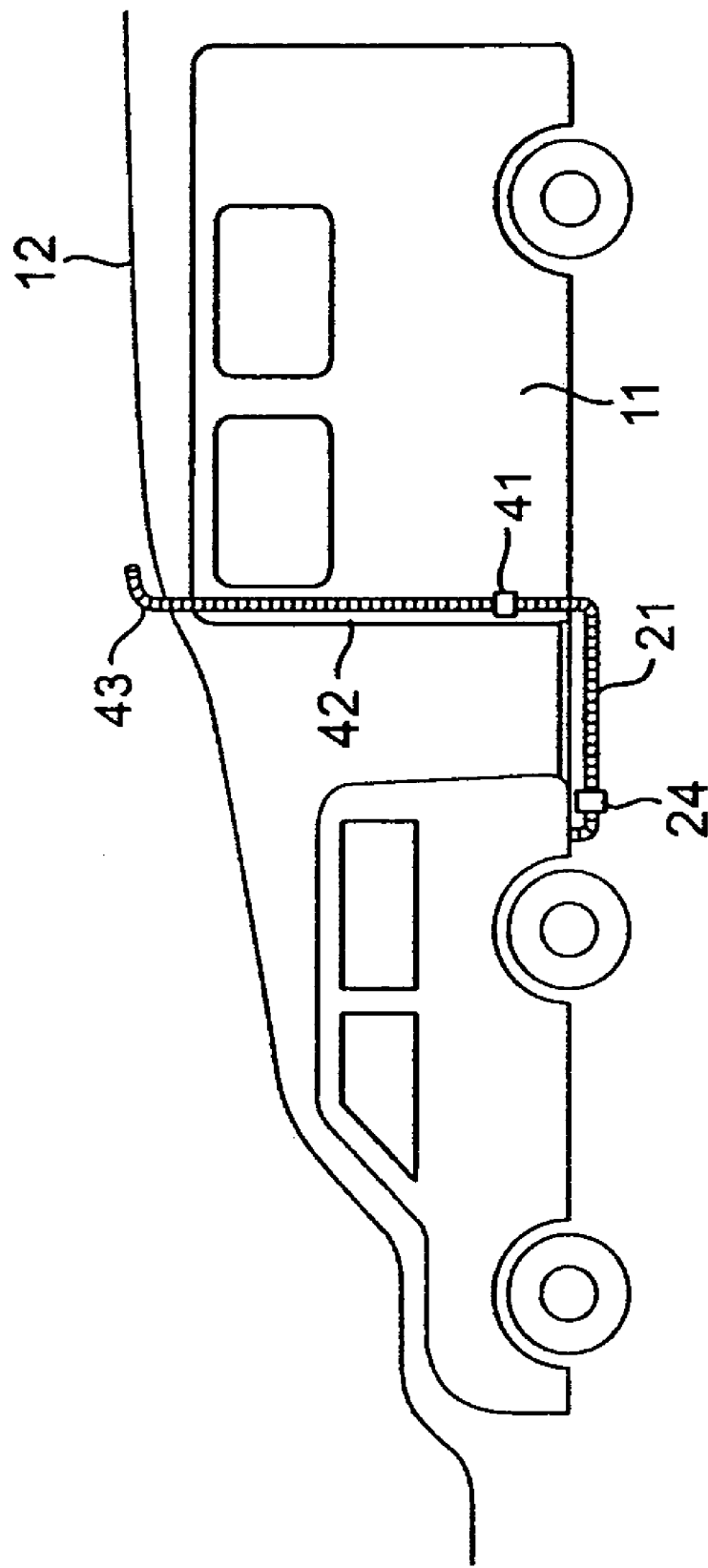
FIG. 4 is a schematic side elevation of a towing vehicle and trailer incorporating an exhaust diverter according to a second embodiment of the present invention.

FIG. 4 illustrates an embodiment wherein the conduit 21 leads from the exhaust coupling 24 to a riser coupling 41 which is located adjacent a forward portion 42 of the trailer 11. Accordingly, the riser or chimney 43 is mounted adjacent the front portion 42 and rises to a point above the wake zone 12.

Figure 5:
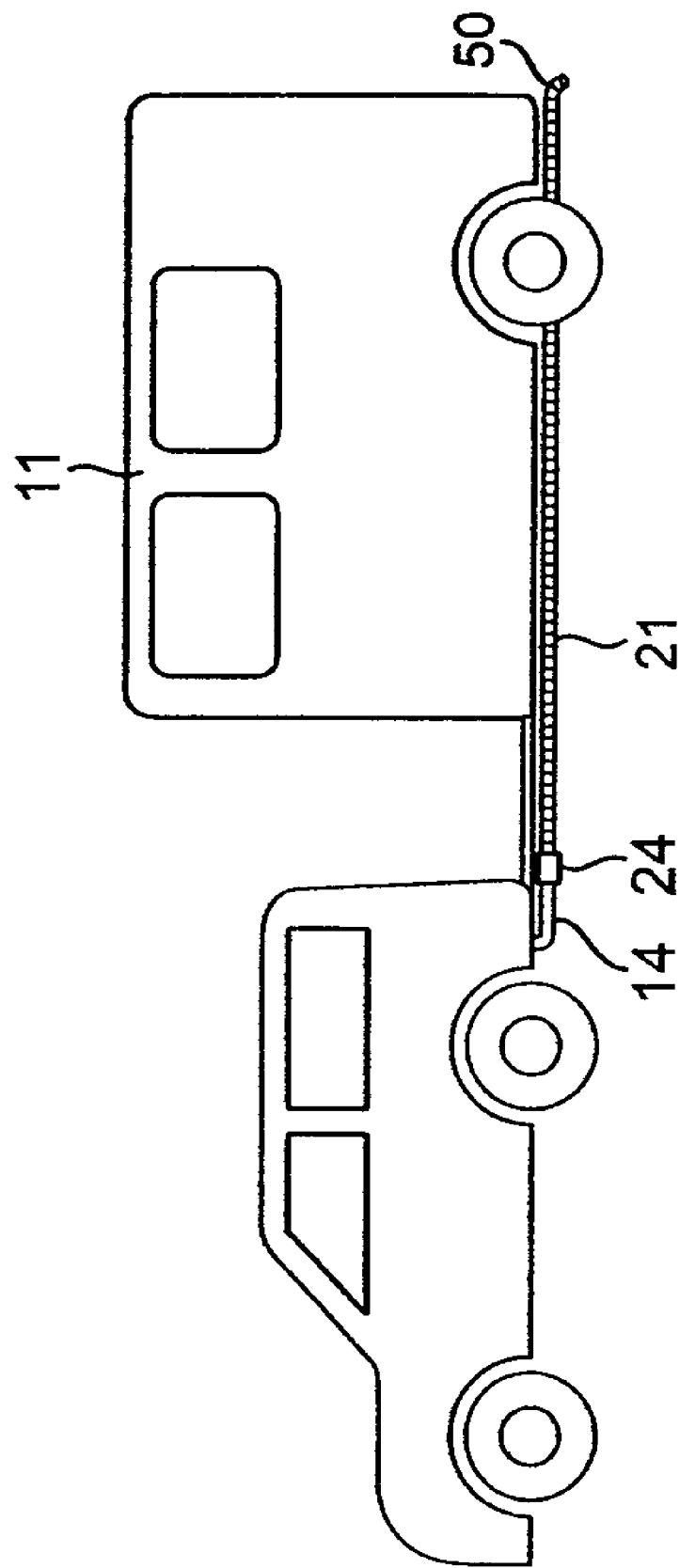
FIG. 5 is a perspective side elevation of a vehicle and trailer incorporating a further example of an exhaust fume diverter of the present invention.

As shown in FIG. 5, a further embodiment demonstrates that the conduit 21 can extend from the exhaust 14 and the exhaust coupling 24 to a point below the chassis of the trailer 11 and terminating at the rear of the trailer 11 at a position which would correspond to the location of a conventional exhaust discharge in a motorized vehicle. In some cases, the terminal portion 50 of the conduit 21 may be turned downward so as to encourage the exhaust fumes to either exit the wake zone 12 or at least prevent them from entering the interior compartment of the trailer 11, once such fumes are discharged from the diverter.

It will be appreciated that the conduit 21 may be fabricated from flexible hose or from rigid elements such as steel tubes. Where flexible hose is used, for example, at the forward portion of the conduit where it couples with the vehicle's exhaust 14, such flexible hose must be selected so as to withstand the heat and pressure generated by the vehicle's exhaust.

Figure 6:
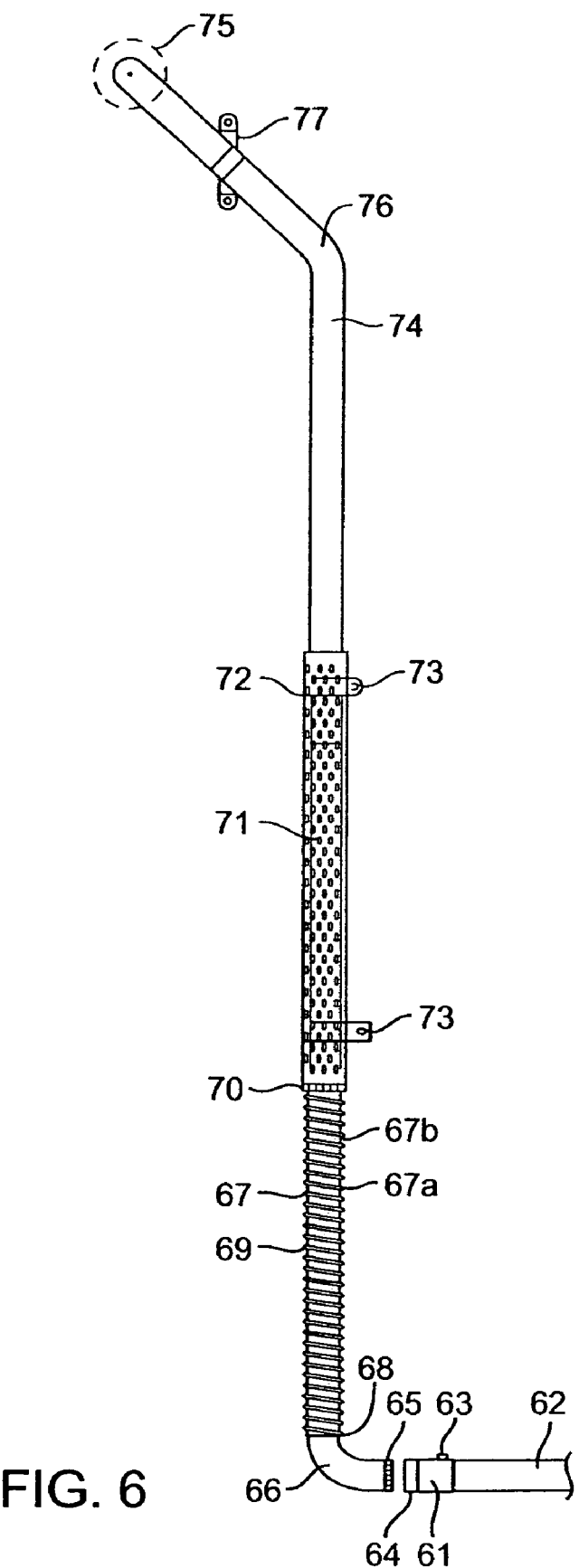
FIG. 6 is a plan view of an exhaust fume diverter of the present invention.
Figure 7:
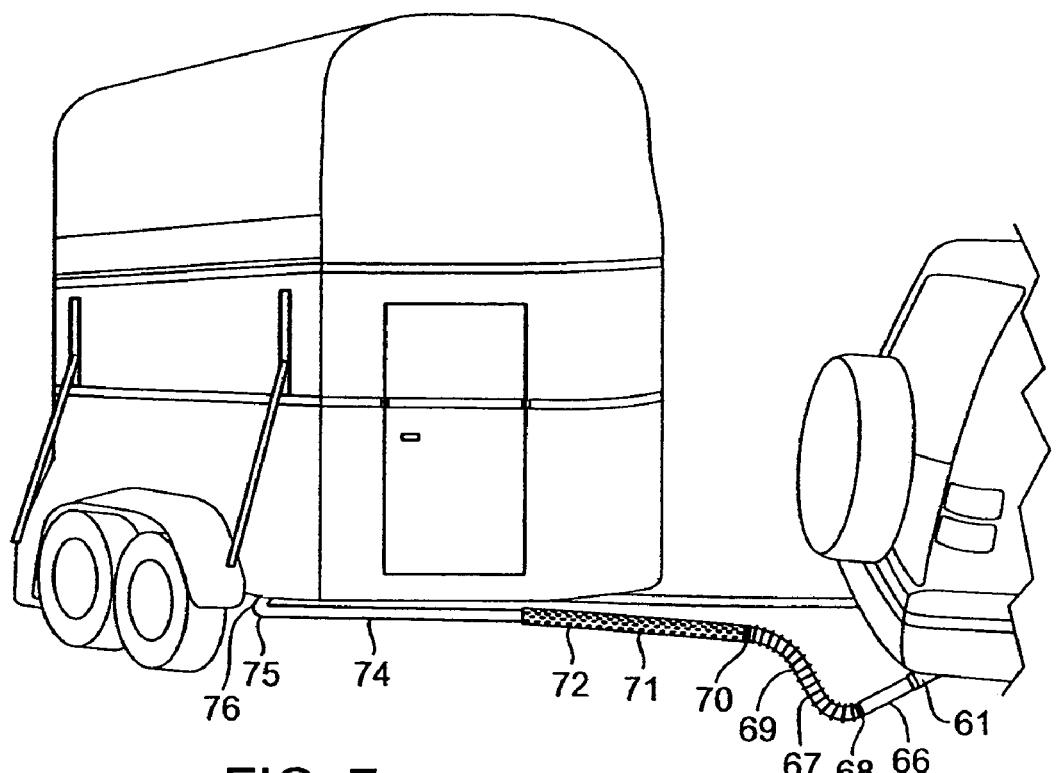
FIG. 7 is a perspective side elevation of a vehicle and trailer incorporating another example of the exhaust fume diverter of the present invention.

An example of such a system is disclosed with reference to FIGS. 6 and 7. As shown there, a diverter 60 comprises an (optional) exhaust adapter 61 which attaches to a vehicle exhaust pipe 62. Attachment may be by welding or by a set screw or other clamping apparatus 63. In the alternative, the flexible component or the bend 66 may be coupled directly to the vehicle exhaust.

The flexible component may assume various forms. In simple embodiments, a heat-resistant polymer may be used to construct a flexible hose or tube. An all-polymer construction, reinforced or otherwise, is easy to couple and inexpensive but not as durable as other flexible component options. Another flexible component is depicted in FIGS. 6 and 7. This embodiment uses a flexible metal spring or coil outer piece 67a to contain and protect an inner tube 67b. The inner flexible tube 67b may be fabricated from one or more layers of woven heat-resistant textile fabrics. In preferred embodiments, the inner layers are more resistant to heat than the outer layers. In this way a gas-tight, strong, heat-resistant and flexible structure is formed for carrying exhaust gases away from the vehicle exhaust. Unlike other flexible heat-resistant tubes, this type of structure is highly flexible, offers little resistance to flexing, has a small bend radius and may be flexed repeatedly without failure.

The adapter 61 is sized to fit a particular exhaust pipe size and present a coupling half 64 to a cooperating coupling half 65 which is carried by a rigid exhaust bend 66. In this example the bend is a ninety degree bend. The bend changes the direction of flow of the exhaust gases toward the towing ball. The exhaust gases are carried in this direction by a flexible component 67 which is coupled to the bend 66 with a suitable fixture 68 or coupling. This allows a central section 69 of the flexible component 67 to be positioned adjacent the tow ball. In this way the flexible component 67 flexes with minimum stretching as the vehicle turns and negotiates bumps and the angle between the vehicle and trailer changes. The distal end 70 of the flexible section 67 couples or is otherwise affixed to a rigid section of exhaust pipe 71 which extends from the flexible section termination point to preferably a location under the trailer. The rigid section 71 is therefore exposed. To protect the safety of humans and animals in the vicinity, a protective heat shield 72 is located over the exposed section 71 of pipe. The heat shield 72 is, for example, a perforated metal half tube or "U"-shaped structure (in cross-section) which includes tabs 73 or other means for attaching the shield 71 to the trailer structure. The exposed section then continues by way of a rigid section 74, under the trailer in this example, to a location 75 just forward of the front trailer wheels 76. The rigid section 74 may incorporate whatever bends 76 and brackets 77 as are required to suit a particular trailer.

Figure 8:
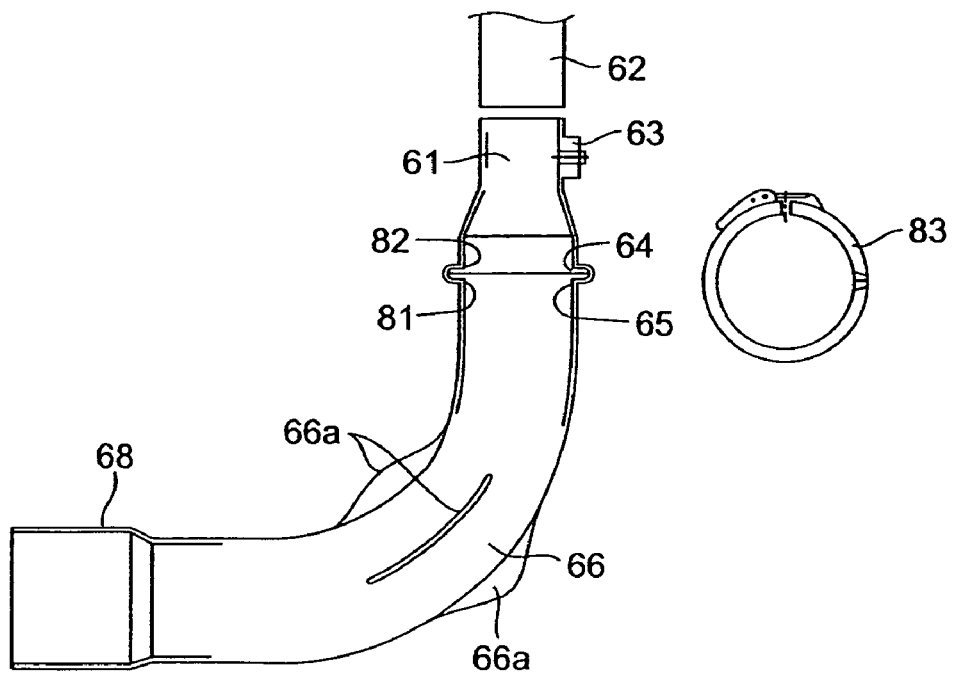
FIG. 8 is a partially cross-sectioned side elevation of a bend and exhaust adapter which may be used in the exhaust fume diverter of the present invention.

As shown in FIG. 8, coupling between any rigid or flexible components of the present invention may be achieved by providing flanges 81, 82 on adjacent components and a clamp 83 having a "U"-shaped cross-section around the adjacent flanges 81, 82. In this example the coupling is made between the exhaust adapter 61 and the bend 66. FIG. 8 also shows the use of cooling fins on the bend 66, particularly near the hottest portion of the bend where the exhaust fumes impact on the turning portion of the bend wall.

Figure 9:
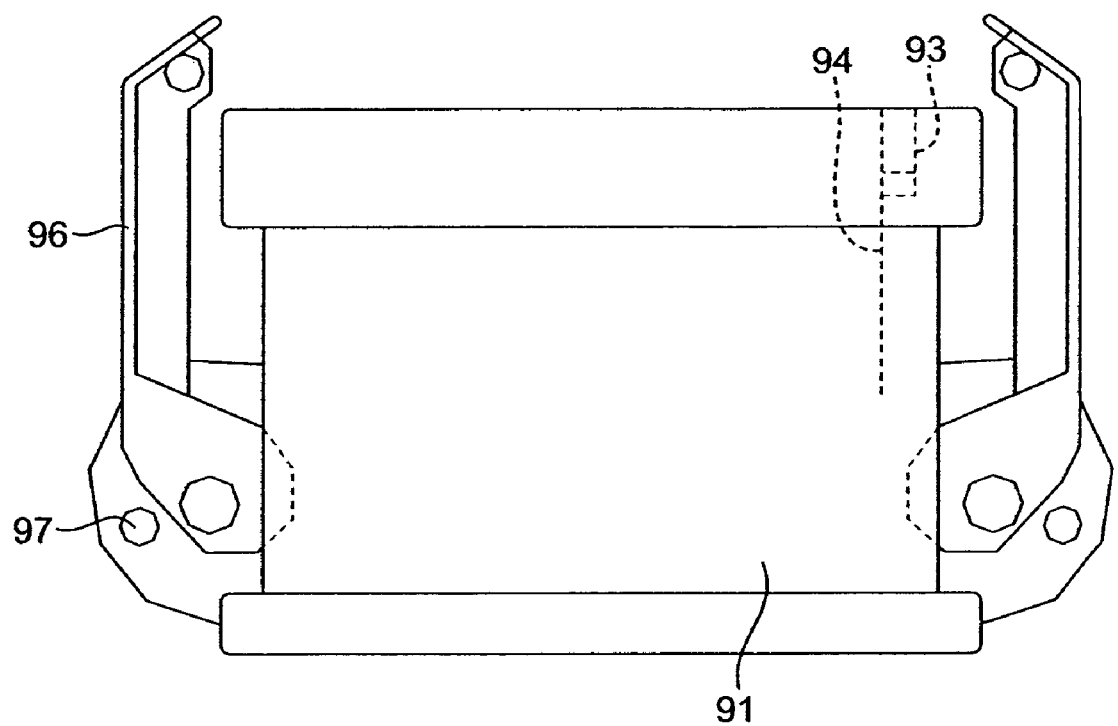
FIG. 9 is a side elevation of a bayonet coupling used in an example of the exhaust fume diverter of the present invention.
Figure 9:
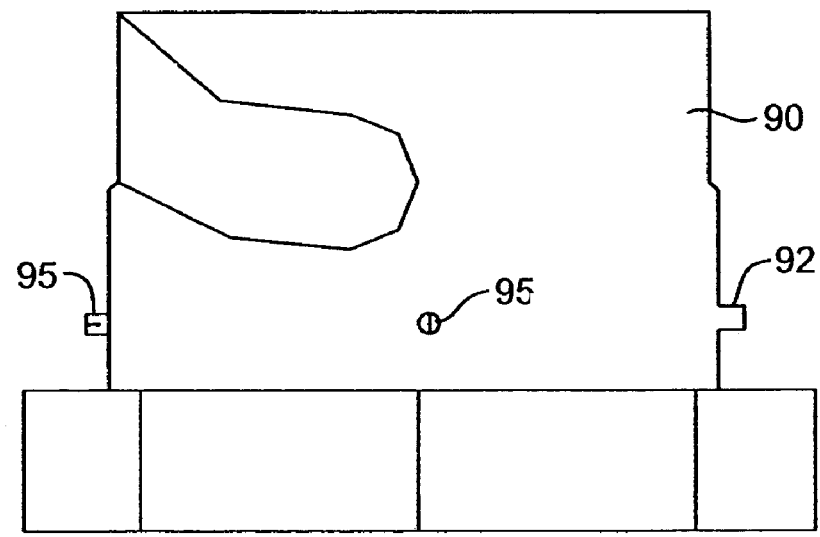

As shown in FIG. 9, a bayonet coupling with two halves 90, 91 may also be used. As is known in the coupling art, the female half 91 receives the male half with an optional rotating action which seals the halves together. Locking arms are pivotable to interlock the halves. This type of coupling is particularly useful in joining the flexible portion 67 to the bend 66 or the bend 66 to the exhaust adapter 61. In some embodiments, the halves do not rotate and in fact are prevented from rotating by an anti-rotation pin 92 on the inner male and a cooperating slot 93 on the inner wall 94 of the female half 91. This prevents the coupling from rotating during use. In preferred embodiments the male is fitted to the vehicle exhaust, for example, with set screws 95. Also preferred is that a single locking lever is used (two are shown). The single lever 96 should point down toward the ground in use, for ease of assembly. An opening 97 in the retention ear 98 is provided for receiving a safety anti-release pin or chain.

It will also be appreciated that one purpose of the exhaust fume diverter of the present invention is to minimize the risk of noxious exhaust fumes entering the interior compartment of a towed trailer, float or other vehicle. To do this, the exhaust fumes must exit the diverter at a point which minimizes this risk of entry. In some examples (for example FIG. 5) the exhaust exit is toward, adjacent to or beyond the rearmost portion of the towed vehicle 11. This corresponds to a generally conventional exhaust discharge point in the sense that it is where the exhaust discharge would be located if the trailer 11 were a powered vehicle. In other embodiments (for example FIGS. 2 and 4) the exhaust fume diverter incorporates a riser or chimney which allows the discharge point of the diverter to be above the uppermost point of the trailer 11. It is desirable but not essential that the discharge point be near to or above the uppermost point of the trailer 11. In particularly preferred embodiments, the riser or chimney extends above the point which constitutes the boundary of the wake zone 12.

It will also be appreciated that the exhaust fume diverter of the present invention may be provided as an after-market kit which may be installed on practically any towed vehicle. However, it is equally desirable that the exhaust fume diverter be installed by the manufacturer of a trailer 11 so that the trailer 11 is purchased with the exhaust fume diverter installed and ready for coupling to the exhaust of the vehicle which tows it. When provided on or for a particular vehicle, it may have fewer points of coupling of components and may not necessarily require an exhaust adapter.

Although the present invention has been disclosed with reference to particular materials and details of construction, these should be understood as having been provided by way of example and not as limitations to the scope or spirit of the invention.

What is claimed is:

1. A trailer having an enclosure and a exhaust fume diverter for connection to an exhaust pipe of a vehicle, the vehicle having a tow bar for releasable connection to a coupler of the trailer so that said trailer can be towed by said vehicle, the diverter comprising:
   a conduit along which exhaust fumes of said towing vehicle can flow; and
   a coupling member to connect said conduit to a terminal end of the exhaust pipe of the towing vehicle;
   wherein said conduit includes:
      a rigid bent portion having an inlet to be connected to said exhaust pipe by way of said coupling member, an outlet to discharge said exhaust fumes and a connecting portion located between said inlet and outlet and adapted to displace said outlet from said inlet laterally towards said tow bar of said towing vehicle;
      an exhaust portion to be secured to said trailer and having an inlet to receive said exhaust fumes and an outlet to vent said exhaust fumes away from said trailer; and
      a flexible portion connecting said outlet of said rigid bent portion to said inlet of said exhaust portion and adapted in use to maintain flow of said exhaust fumes through said conduit and away from said trailer.

2. The trailer of claim 1 wherein:
the coupling member is removably attachable to the exhaust pipe.

3. The trailer of claim 1 wherein:
the exhaust diverter provides a pathway, external to said trailer for carrying said exhaust fumes from the exhaust pipe to said outlet of said exhaust portion.

4. The trailer of claim 1 wherein:
the flexible portion extends past a hitch carried by the trailer.

5. The trailer of claim 4 wherein:
the diverter passes through the hitch.

6. The trailer of claim 1 wherein:
the exhaust diverter is protected by a heat shield that is attached to the trailer.

7. The trailer of claim 1 wherein:
the diverter passes through a hollow frame element of a frame of said trailer.

8. An exhaust fume diverter for connection between an exhaust pipe of a vehicle and a trailer having an enclosure, the vehicle having a tow bar for releasable connection to a coupler of said trailer so that the trailer can be towed by said vehicle, the diverter comprising:
   a conduit along which exhaust fumes of said towing vehicle can flow; and
   a coupling member to connect said conduit to a terminal end of the exhaust pipe of the towing vehicle;
   wherein said conduit includes:
      a rigid bent portion having an inlet to be connected to said exhaust pipe by way of said coupling member, an outlet to discharge said exhaust fumes and a connecting portion located between said inlet and outlet and adapted to displace said outlet from said inlet laterally towards said tow bar of said towing vehicle;
      an exhaust portion to be secured to said trailer and having an inlet to receive said exhaust fumes and an outlet to vent said exhaust fumes away from said trailer; and
      a flexible portion connecting said outlet of said rigid bent portion to said inlet of said exhaust portion and adapted in use to maintain flow of said exhaust fumes through said conduit and away from said trailer.

9. The diverter of claim 8, wherein:
the exhaust portion includes a riser locating said outlet of said exhaust portion above a highest point of the enclosure of the trailer.

10. The diverter of claim 8, wherein:
the diverter includes a locking lever to releasably connect said coupling member to said terminal end of said vehicle exhaust pipe.

11. The diverter of claim 8, wherein:
the flexible portion includes an inner layer of heat resistant material, an outer layer covering said inner layer and a flexible metal coil extending along said flexible portion and surrounding said layers.

12. The diverter of claim 8 wherein:
the flexible portion further comprises, along a length, an external metal spring.

13. The diverter of claim 8 wherein:
the coupling member is selectively detachable from said terminal end of the exhaust pipe.

14. The diverter of claim 13 wherein:
the coupling member locks to the terminal end of the exhaust pipe with set screws.

15. The diverter of claim 8 wherein:
the conduit is fabricated from woven materials that withstand the vehicle exhaust fumes and repeated flexing.

16. The diverter of claim 8 further comprising:
a heat shield that is for mounting to a towed vehicle between the diverter and trailer.

* * * * *